United States Patent

[11] 3,583,508

| [72] | Inventors | Clive Waddington<br>Stratford;<br>John F. Whelahan, Monroe, both of, Conn. |
|---|---|---|
| [21] | Appl. No. | 852,003 |
| [22] | Filed | Aug. 21, 1969 |
| [45] | Patented | June 8, 1971 |
| [73] | Assignee | Avco Corporation<br>Cincinnati, Ohio |

[54] ENGINE SPEED AND STEERING CONTROL APPARATUS FOR TWO PATH-SPLIT TORQUE TRANSMISSION
8 Claims, 3 Drawing Figs.

| [52] | U.S. Cl. | 180/6.44, 60/19, 60/97 |
|---|---|---|
| [51] | Int. Cl. | B62d 11/14 |
| [50] | Field of Search | 180/6.44, 6.48; 60/19, 97 E; 74/720.5 |

[56] References Cited
UNITED STATES PATENTS

| 3,184,913 | 5/1965 | Anderson et al. | 60/19 |
| 3,349,860 | 10/1967 | Ross | 180/6.44 |
| 3,369,419 | 2/1968 | Henstrom et al. | 180/6.44 |

*Primary Examiner*—Benjamin Hersh
*Assistant Examiner*—Leslie J. Paperner
*Attorneys*—Charles M. Hogan and Melvin E. Frederick ABSTRACT: A steering system for providing steering control with a two path-split torque transmission in track laying vehicles and the like. One track driven through one transmission is controlled by both engine speed and engine power input and the other track driven through a second transmission is controlled via comparator means by steering input and track speed inputs of both tracks to provide the required speed difference between the tracks for full steering control independent of speed.

JOHN F. WHELAHAN
CLIVE WADDINGTON
INVENTORS

BY Charles M. Hogan
Melvin E. Frederick
ATTORNEYS

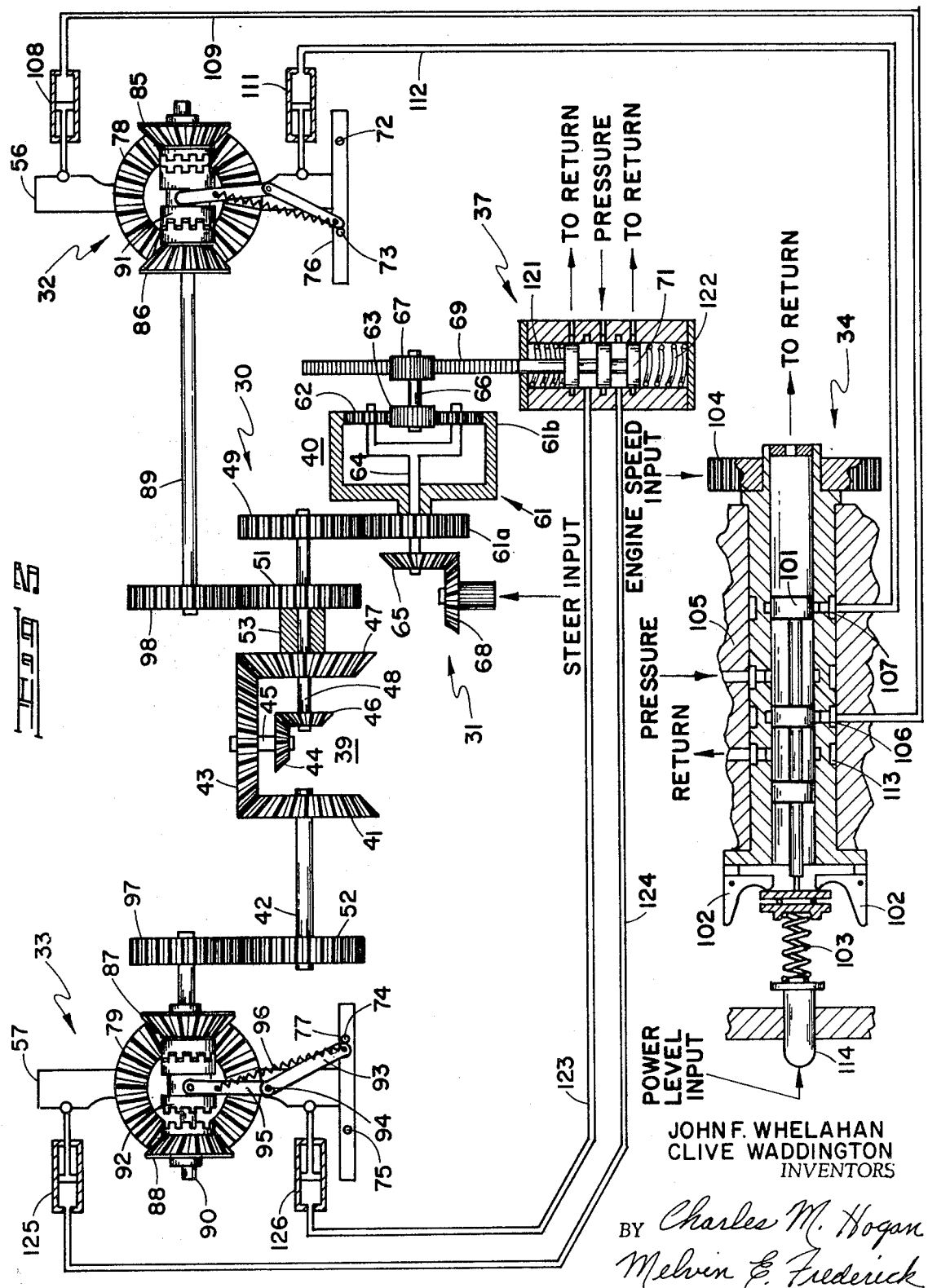

ENGINE SPEED AND STEERING CONTROL APPARATUS FOR TWO PATH-SPLIT TORQUE TRANSMISSION

This invention relates to a steering system for self-propelled vehicles and more particularly to a steering system for vehicles having a two path-split torque transmission coupled to a free power turbine wherein steering is accomplished by changing the relative speeds of wheels or other traction devices on opposite sides of the vehicle.

In certain heavy and cumbersome vehicles, particularly tracked vehicles, steering is accomplished by driving the tracks or other traction devices on opposite sides of the vehicles at different speeds, the vehicle turning toward the low speed side. Through suitable control of the relative speeds of the traction devices, an extremely high degree of vehicle maneuverability can be obtained. In this respect, various steering control arrangements for making possible a broad range of vehicle movements, including pivot turns about the vehicle's center axis, are well known.

Apart from the steering function, it is desirable in such vehicles that the power system for driving the vehicle have infinitely variable drive ratio capabilities as provided with an automatic transmission. An infinitely variable transmission allows the drive ratio to be varied through an infinite number of drive ratios selected without the disadvantages of shifting or other step changes which can cause rough operation and accompanying wear on the entire power system. This rough operation and wear can be extremely significant in heavy vehicles of the type under consideration because of the high torque levels normally present in such systems. In addition to causing rough operation and wear, step changes through a number of discrete drive ratios cause the prime mover to operate at speeds which are undesirable or at which its fuel consumption is substantially greater than optimum for the horsepower required to drive the vehicle. Finally, it is desirable that the mechanisms for driving and steering the vehicle be integrated into a power system for accomplishing both functions smoothly and efficiently.

Ever since the adoption of the internal combustion engine as a power source for the propulsion of large vehicles, the ultimate objective has been to eliminate the use of gears to obtain speed ratio changing. Accomplishment of this end requires a unit that has infinitely variable ratio capabilities. A "gearless" or "stepless" unit which has been developed in the hydrostatic drive which lends itself readily to continuous variation of the torque ratio. This characteristic is secured in the hydrostatic drive by providing a variable displacement pump unit connected to a fixed displacement motor unit.

A hydrostatic drive having an infinitely variable control feature for speed torque and steer is the so-called two path-split torque XHM-1500 hydromechanical power train developed for the Army Tank-Automotive Command. As used herein, the term "two path-split torque" as applied to power trains or transmissions is one in which power is transmitted hydrostatically and mechanically through two independent split-torque transmissions.

Broadly, the major components of such a two path-split torque transmission, a type with which the invention will be disclosed, include as major components forward-reverse clutches, hydraulic power transmission means including variable displacement hydrostatic units and fixed displacement hydrostatic units, first, second and third range clutches, combined output planetaries, and hydrodynamic and mechanical brakes. In the XHM-1500, for example, in the first range, full hydrostatic power is provided through two independent variable-displacement pump and fixed displacement motor units. Reversing direction in the hydrostatic path is accomplished within the hydrostatic units by changing pump displacement, hence, no clutch engagements are required. In second and third ranges, the power is divided into two paths, one through the hydraulic power transmission means (hydrostatic) and one through the friction clutches and planetary gearing (mechanical). Combining these two power paths at each output provides a highly efficient hydromechanical drive. Application of the clutches is made at synchronous speed resulting in smooth application of power and extended clutch life. The forward and reverse clutches provide the desired direction of rotation to the mechanical path.

Hydrostatic steering is utilized and provides infinitely variable speed ratio plus pivot steer. The capability of independently driving each track provides the greatest differential track speed of any known power train in use today. The two path-split torque transmission by reason of its individual hydraulic power transmission means for controlling each track offers infinitely variable steer ratios. The provision of independent control of speed and direction of each track provides substantially any radius of turn at any speed within a vehicle's capabilities for negotiating turns. Further, a true pivot steer (no forward or reverse movement of the vehicle) is available. With precised and positive control of track speeds, regardless of torque transmitted, the two path-split torque transmission provides steering capabilities which are unobtainable with slipping steer clutches or hydrostatic controlled differential systems. Further such a system provides the sensitivity required for high speed traveling or operation on slippery terrains, the automaticity for effortless cruising and the tight turning radii for maneuvering in close quarters. The two path-split torque transmission has the capability of driving one track at about 45 miles per hour forward while driving the other track at about 8 miles per hour in the reverse direction. Accordingly, such a power train also provides the high differential track speed desirability for amphibious operations.

In use the engine is mounted directly to the power train in a T-drive arrangement. Power from the engine is transferred through a common input such as bevel gears to the aforementioned hydrostatic units. In first range, all the power is delivered through the hydrostatic units to the outputs. In second and third range, the power is split into two paths, one through the hydrostatic units to form the hydrostatic path and one through the forward or reverse clutches and then appropriate gearing and clutches to form the mechanical path. The power is then combined at the output planetaries for transmittal to output shafts coupled to the tracks. An important feature of the two path-split torque transmission is the aforementioned pair of hydrostatic units. Each side is identical and as previously noted may consist of one variable displacement unit and one fixed displacement unit coupled together as by a valve plate, each variable displacement unit receiving its drive from a common input bevel gear set.

The mechanical makeup of the variable displacement units and the fixed displacement units are the same. Each may, for example, comprise a universal joint, drive flange, tilt box, control rods and pistons, connecting rods, pistons, and cylinder block.

The input shaft of each variable displacement unit is connected to the drive flange or swash plate by a constant velocity universal joint, the drive flange driving the pistons through the connecting rods. Nine or more cylinders and pistons may be provided in the rotating cylinder block. When the drive flange or swash plate rotates in a plane at some angle to the cylinder block, the pistons in conventional manner move in and out of the cylinder bores alternately drawing oil in and discharging it from each cylinder. The angle of the drive flange or swash plate is determined by the tilt box which is positioned by the control rods and control pistons. As the cylinder block rotates, the face passes over a timing or valve plate which may consist of two kidney-shaped ports which serve as suction and discharge valves for each cylinder. The oil under pressure is ported through the valve block to the fixed displacement unit which functions the same as the variable displacement unit except the process is reversed. Flow and pressure act on the fixed displacement unit pistons to create speed and torque for the output shaft. Moving the variable displacement unit tilt box and hence the drive flange through its full range provides maximum speed of the fixed displacement unit in one direction to zero speed and then full speed in a reverse direction without the need of clutches or gearing. For a further and more complete discussion of two path-split torque transmissions and hydraulic power transmission means reference is made to "The Evolution of Power Trains and Steering in High Speed Military Track Laying Vehicles" by E. Hamparian, published by the Society of Automotive Engineers, Farm, Construction and Industrial Machinery Meeting, Milwaukee, Wisconsin, Sept. 11—14, 1967.

Especially where prior art two path-split torque transmissions are coupled to turbines, a problem may arise when both steering and input speed controls are required simultaneously. If engine speed control takes priority it is possible for the steering to change without a command from the operator and if steering has priority, it is possible to overspeed or underspeed the engine.

Accordingly, it is an object of the present invention to provide an improved steering system.

Another object of the invention is to provide improved steering apparatus for double differential transmission adapted to be coupled to a free power source.

A further object of the invention is to provide steering apparatus for transmissions wherein steering is not affected by shifts during a turn.

A still further object of the invention is to provide means for steering a two path-split torque automatic shifting transmission that provides positive engine speed control and smooth and controllable steering operation at substantially any speed.

The novel features that are considered characteristic of the invention are set forth in the appended claims; the invention itself, however, both as to its organization and method of operation, together with additional object and advantages thereof, will best be understood from the following description of a specific embodiment when read in conjunction with the accompanying drawings, in which:

FIG. 3 is a diagrammatic view disclosing details of the components shown in FIG. 2.

Figure 1:
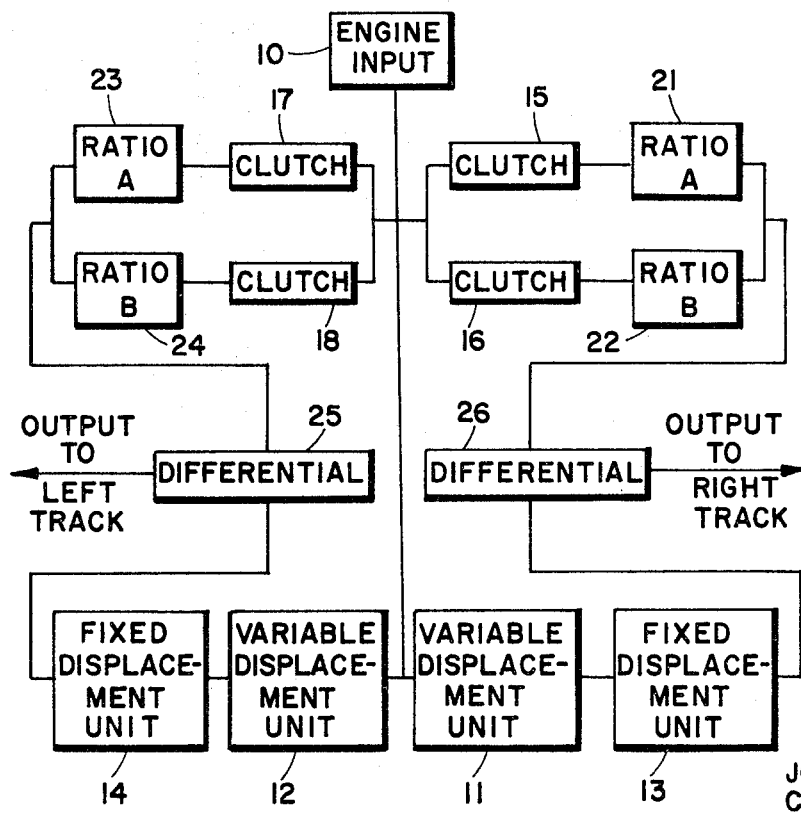
FIG. 1 is a block diagram illustrating a conventional two path-split torque transmission.

Referring now to FIG. 1 which shows in block diagram the principal components of a typical two path-split torque transmission for a track laying vehicle, there is shown a variable speed power source 10 such as a free power gas turbine conventionally mounted directly to the power in a T-drive arrangement. Power from the engine 10 is transferred through bevel gears (not shown) to respectively right and left hydraulic power transmission means comprising respectively hydrostatic variable displacement units 11 and 12 and left fixed displacement units 13 and 14. Power is also transferred through forward and reverse clutches (not shown) and then to right and left drive sets of clutches 15, 16, and 17, 18, and gearing 21—22 and 23—24. Power is separately coupled to the tracks through clutches 15 and 17 to gearing 21 and 23 providing ratio A or through clutches 16 and 18 to gearing 22 and 24 providing ratio B. For additional clutches and gearing as and for the purposes described hereinabove are provided. The output of the aforementioned right and left gearing as well as the output of fixed displacement units 13 and 14 are coupled to right and left differentials 25 and 26 which drive respectively the right and left tracks (not shown).

The differentials 25 and 26 transmit power mechanically from the input to the output of the power train and hydraulic units 13 and 14 function to vary the output speeds of the differentials 25 and 26 by controlling rotation of reaction members (not shown) forming a part of each differential. At the zero displacement positions of both variable displacement hydraulic units 11 and 12, the fixed displacement units 13 and 14 serve as reaction units only and all power is delivered mechanically from a common power input to the two separate power outputs. The zero displacement position of the variable displacement units 11 and 12 is the midpoint of any available split torque speed range. The split torque speed range is selected by engaging the appropriate right and left drive clutches on each side of the power train. Displacement to one predetermined side of center of the variable displacement units 11 and 12 drives the fixed displacement units 13 and 14 causing an increase in the output speed of the differentials 25 and 26. Displacement to the opposite side of center of the variable displacement units result in power recirculation back to the input and reduced differential output speed.

Broadly, steering is effected by setting different displacements on each of the variable displacement units 11 and 12, thereby causing different output speeds on each of the differentials. With each differential output coupled to a different track of tracked vehicle, steering is accomplished by causing a speed difference between the tracks. The transmission may be used to control the speed of the engine 10 by using an engine speed governor to change the transmission ratio by varying the displacement of the hydraulic units 11 and 12. If, for example, the engine speed is higher than the setting of the governor, the governor actuates the hydraulic units 11 and 12 in the proper direction to increase the flow to the hydraulic units 13 and 14 which in turn increases the speed of the outputs of the differentials 25 and 26 and impose an additional load on the input or engine 10. The load on the input increases until the input speed decreases to that required or called for by the governor setting. If the engine speed is below the governor setting, the hydraulic units 11 and 12 are actuated in the opposite direction to allow additional flow from the hydraulic units 13 and 14 to the hydraulic units 11 and 12, causing the differential reaction members to rotate in a direction which reduced the output speed of the differentials 25 and 26. This action reduces the load on the input or engine 10, thereby causing it to speed up. This actuation of the hydraulic units 11 and 12 continues until the governor speed setting is again satisfied. For any particular power level, the engine speed governor modulates the displacement of the hydraulic units 11 and 12 to maintain a fixed input speed to the transmission.

Notwithstanding the above, a problem arises when both steering and input speed control are required simultaneously. Thus, if engine speed control takes priority during a suitable course change, it is possible for the steering to change without a command from the operator. On the other hand, if steering control has priority, it is possible to overspeed or underspeed the engine.

In accordance with the present invention, the aforementioned difficulties are overcome by controlling one track with an engine speed governor and controlling the other track via comparator means by steering input and track speed inputs of both tracks to provide the required speed difference between the tracks for full steering control. Directing attention to FIG. 2 which is shown by way of example comparator means 30 for receiving a steering input signal from steering means 31, a right track speed signal from right track speed control means 32, and a left track speed signal from left track speed control means 33. The right track speed control means 32 is actuated by an engine speed governor 34 which is biased by power level input to the transmission from suitable power level indicator means 35 and by the engine speed output from suitable engine speed indicator means 36. Returning now to the left track, its speed is controlled by left track speed control means 33 via steer valve means 37 which is in turn actuated by the output signal from the comparator 30. The output signal of comparator 30 is in all cases sufficient to provide the required difference between the tracks for full steering control.

In the absence of a steer signal from the steering control means 31 the engine speed governor 34 controls the speed of the right track via right track speed control means 32. The comparator 30 via speed input signals from both track speed control means 32 and 33 controls the speed of the left track to match that of the right track. On the other hand, in the presence of a steer signal and the absence of a requirement for a speed or power level change, the comparator 30 actuates the steer valve means to appropriately increase or decrease the speed of the left track. For purposes of explanation, consider now a requirement for an increase in left track speed (a right turn is required). The steer input signal from steer control means 31 actuates the steer valve means 37 via comparator 30 which effects an increase in left track speed and this increase in left track is then fed back to the comparator to partially null the steer valve means 37. However, the increase in left track speed increases the load on the engine, thereby causing a reduction in engine speed. This reduction in engine speed biases the engine speed governor 34 which results in a decrease of the speed of the right track, thereby now unloading the engine and causing it to speed up to correct the previous underspeed condition. The aforementioned reduction in right track speed causes an increase in steer and this speed change is fed back to the steer valve 37 via comparator 30 causing the steer valve means 37 to travel its null position and satisfy the steer input signal.

If the right track speed changes by virtue of a power level or engine speed change without a steer input signal to the comparator this right track speed change is coupled to the steer valve means 37 via comparator 30 and effects an equal change of speed of the left track. It will now be seen that the present invention provides steering and engine speed control simultaneously in all situations.

Figure 2:
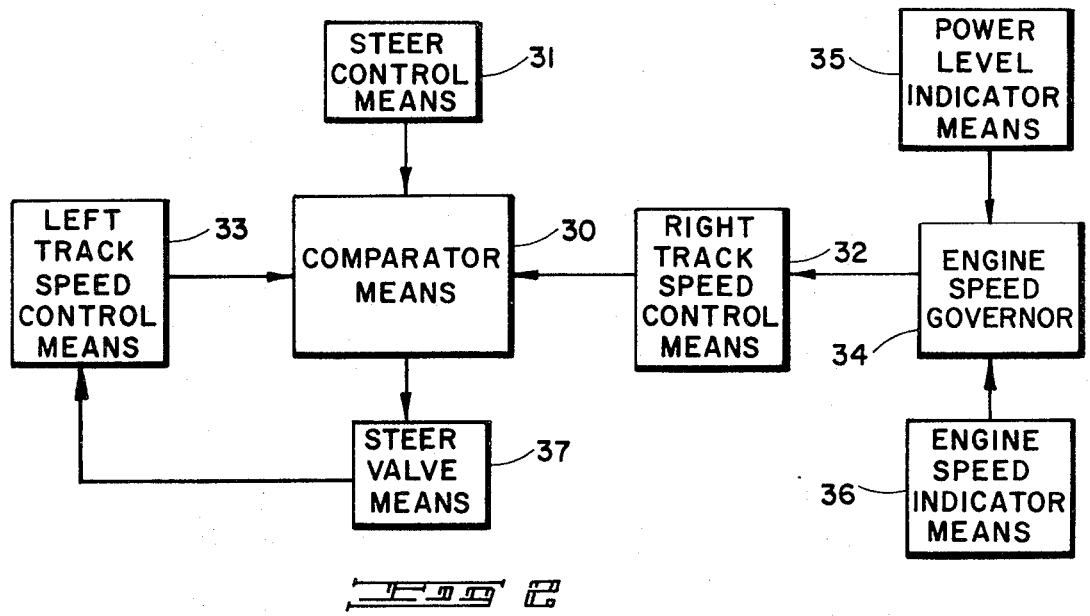
FIG. 2 is a block diagram of steering apparatus in accordance with the invention.

Attention is now directed to FIG. 3 which shows by way of example details of the components shown in FIG. 2. While the aforementioned components will be shown mechanically for convenience, it is to be understood that conventional hydraulic or electrical components that operate in conventional manner to provide substantially the same results may be used. Thus, for example, means 31, 32, and 33 may provide in conventional manner hydraulic signals to a hydraulic comparator 30, or alternately, means 31, 32, and 33 may provide in conventional manner electrical signals to an electrical comparator 30, in the manner shown in FIG. 2.

Directing attention now to FIG. 3, the comparator 30 as shown comprises a differential gear set 39 and a planetary gear set 40. The differential gear set 39 is comprised of bevel gear 41 attached to and driven by input shaft 42, bevel gears 43 and 44 attached to shaft 45, and bevel gear 46 and 47. Bevel gear 46 is attached to output shaft 48 as is output gear 49. Bevel gear 47 and gear 51 are attached to hollow input shaft 53 which rotates freely around shaft 48. The inputs to the differential gear set 39 are gears 52 and 51. The output is gear 49. The differential gear set 39 solves the equation $Z = X \pm Y$. If the rotation of input gears 51 and 52 (inputs) are denoted as $X$ and $Y$ respectively and the rotation of gear 49 (output) is denoted as $Z$ the differential gear set 39 solves the aforementioned equation. Thus, a rotation of $X$ and $Y$ in the same direction results in addition; a rotation of $X$ and $Y$ in the opposite direction results in subtraction and if the rotation of $X$ and $Y$ are equal and opposite in direction, the net output $Z$ is zero. The input gears 51 and 52 receive rotations which are proportion to respectively the position of swash plates 56 and 57 of the right and left variable displacement hydraulic units 11 and 12. The rotation of the input gears 51 and 52 at the upper end of the third gear range is three times the rotation at the upper end of the first gear range, the rotation of these input gears being proportional to the speed of the right and left tracks respectively for any fixed engine speed.

The planetary gear set 40 which is driven by the output gear 49 of the differential gear set 39 includes a ring gear 61, carrier gears 62 and sun gear 63. Ring gear 61 is a double gear having a spur 61a attached to an inner ring gear 61b. Carrier gears 62 and engage ring gear 61b are rotatably attached to a shaft 64 which is in turn attached to bevel gear 65. The sun gear 63 is attached to a shaft 66 common with pinion gear 67. The inputs to the planetary gear set 40 are gears 61a and 65 and the output of the planetary gear set is pinion gear 67. In a manner similar to that of the differential gear set, the planetary gear set solves the equation $Z = Y - C(X+Y)$: where $C$ is the ratio of the ring gear 61 to the sun gear 63. The rotation of ring gears 61 and carrier gears 62 are $X$ and $Y$ respectively, and the rotation of sun gear 63 is $Z$. Steer input to the planetary gear set is provided via bevel gear 68 which is coupled to bevel gear 65 which in turn drives carrier gears 62 via shaft 64. The track speed feedback summation from the output gear 49 of the differential gear set is coupled to gear 61a which in turn drives the ring gear 61b. The result of the inputs to the planetary gear set (track speed feedback summation from the differential gear set and the steer input from bevel gear 68) rotates pinion gear 67 and functions to position rack 69. Rack 69 is connected to the spool of steer valve 37. Where the steer input from bevel gear 68 is constant and there is no difference between right and left track speed, there will be a zero output for the planetary gear set.

Steering input is derived from actuation of a conventional steering wheel or the like which may be coupled in any suitable and conventional manner to the steering bevel gear 68. The steering input normally is the operator command signal, commonly the position of the steering wheel as noted above.

The speed of the right and left tracks are directly proportional to and indicated respectively by the accumulated position of the swashplates 56 and 57 of the variable displacement hydraulic units 11 and 12. At the start of the first gear range, the track speed is zero and the swashplates are in the zero displacement position which, as shown in FIG. 3, is midway between the extremities of their angular rotation. Travel of the swashplates is typically about 15° either side of midposition, thereby providing a total travel of about 30°. Typically, the swashplates rotate clockwise as the ratio changes from the bottom to the top of the first gear range. Striking pins 72, 73, 74, and 75 are attached as by crossmembers 76 and 77 to each swashplate and, therefore, rotate with their respective swashplate. Bevel gears 78 and 79 are connected to respective swashplates 56 and 57 and engages oppositely disposed follower bevel gears 85—88 which are free to rotate on common shafts 89—90. Clutches 91 and 92 are spline connected respectively to shafts 89 and 90 intermediate the follower bevel gears 85—86 and 87—88 and are free to slide linearly there between on said shafts. As shown in FIG. 3, the left track bevel gear 79 is locked to the shaft 90 via clutch 92. It will now be seen that rotation of either swashplate will result in rotation of its bevel gear which is coupled to one of its follower gears via its clutch, this will result in rotation of shafts 89 and/or 90. Directing attention now to the left track control means 33, as the swashplate 57 comprising part of said left track control means 33 rotates in a clockwise direction, the right-hand striking pin 74 drives the toggle link 93 about its grounded or fixed pivot pin 94. When the longitudinal axis on the toggle link 93 coincides with the longitudinal axis of the clutch actuating link 95, the toggle spring 96 connected intermediate the ends of the toggle and actuating links 93 and 95 exerts zero force on the clutch 92 in the direction parallel to the linear motion of the clutch. When the toggle link 93 passes its center position, the toggle spring 96 functions to snap the toggle link 93 over (to the left in FIG. 3) until it is stopped by the left-hand striking pin 75. With the toggle link 93 now abutting the left-hand striking pin 75, the toggle spring 96 exerts a linear force which snaps the clutch 92 to the left in FIG. 3, thereby disengaging the clutch 92 from the right-hand follower gear 87 and engaging it with the left-hand follower gear 88. At this point in time, the right-hand striking pin 74 will be slightly past center which point is the extremity of swashplate travel in this direction. The bottom or lower end of the second gear range begins at this point and, thereby causes the swashplate 57 to begin to travel in the opposite or counterclockwise direction as the second gear range progresses toward its top or high end. Although the swashplate 57 as described above reverses its direction of travel, the direction of rotation of shaft 90 remains the same because of the engagement of the left-hand follower gear 88 with the clutch 92. As the ratio or second gear range progresses toward its upper end the left-hand striking pin 75 now drives the toggle link 93 in the same manner as the right-hand striking pin 74 previously drove the toggle link. Again, once the toggle link has moved past center the toggle spring snaps the clutch to the right where it again engages the right follower gear 87. The swashplate again reverses its direction and the right striking pin again drives the toggle link as the ratio progresses to the top of the third gear range. The direction of rotation of each shaft 90 and 89 is continuous in the same direction throughout the progression through the various gear ranges which in this case, for purposes of explanation, has been selected as three ranges. The position or amount of rotation of the shafts 89 and 90 is proportional to track speed of respectively the right and left tracks. The left shaft 90 associated with the left track is connected to gear 97 which engages and actuates gear 52 which in turn is attached to shaft 42 common with the differential bevel gear 41. The right shaft 89 is connected to gear 98 which is coupled to and actuates gear 51 which is connected to bevel gear 47. From the above it will now be seen that the left and right track speeds respectively are the two inputs to the differential gear set 39 of the comparator 30.

The engine speed governor 34 is a three way, infinite position valve having a spool 101 positioned by the resultant of the force of the centrifugal weights 102 opposed by a power level spring 103. The centrifugal weights 102 exert, (via gear 104 which is fixedly mounted on casing 105 and driven at a speed proportional to the engine speed input) a force proportional to the square of the speed of the engine. The spring 103 exerts a force proportional to the power level of the engine. As a result of the forces exerted by the centrifugal weights 102 and spring 103, the spool 101 moves to an equilibrium position determined by the result of these two forces. It will now be seen that, for example, an overspeed signal (i.e. the centrifugal force of the weights 102 is greater than the force of the power level spring 103) will cause the spool 101 to move toward the left and couple cylinder port 106 of the governor to the supply pressure and simultaneously couple cylinder port 107 to return. The movement of the spool to the left causes, as a result of the application of pressure to cylinder 108 via pipe 109 and the removal of pressure from cylinder 111 via pipe 112, a counterclockwise movement on the right swashplate 56. As the spool 101 moves to the left, the power bevel spring 103 becomes compressed and thereby increases its force on the spool 101. The spool will stop moving when the aforementioned forces on it are equal. As the swashplate rotates, the gear ratio is reduced and this imposes a greater load on the engine and this increased load on the engine results in a reduction engine speed. As the engine speed governor senses an underspeed condition, (the force of the centrifugal weights is less than the opposing force of the power level spring) the spool 101 is now caused to move toward the right. Movement of the spool toward the right reduces the flow of fluid through the engine speed governor and when the spool is centered (as shown in FIG. 3) flow is zero. When the spool passes over center to the right, the supply pressure is now coupled to cylinder port 107 and return pressure is coupled to cylinder port 106 via cylinder port 113, thereby, causing the swashplate 56 to now rotate in a clockwise direction which increased the gear ratio thereby unloading the engine. In the manner described above, engine speed control means operates to control the speed of the engine and maintain a constant engine speed for any particular power level setting.

Power level input to the engine speed governor is obtained by movement of the pin 114 against the power level spring 103. Pin 114 may be actuated by the throttle (not shown). Alternately, the pin 114 can be caused to move by any suitable means which is actuated by the turbine engine compressor discharge pressure. Since a turbine engine compressor's discharge pressure is proportional to the power level, the power level spring 103 applies to spool 101 a force which is proportional to power level.

Engine speed input to the governor may be obtained as shown in FIG. 3 by a gear 104 coupled to the output shaft of the engine (not shown). Accordingly, the speed of gear 104 and hence the rotation of centrifugal weights 102 are proportional to engine speed.

The steer valve 37 is a three-way infinite position valve having a spool 71 connected with a rack 69 which is in engagement with and positioned by pinion gear 67. As previously described, pinion gear 67 is attached to shaft 66 which is common with sun gear 63 in the planetary gear set. The spool 71 is spring centered to its null position as shown in FIG. 3 by springs 121 and 122. Steer signals to the left track speed control means 33 are produced by movement of the spool 71 to either side of its null or center position. Depending on the direction of movement of spool 71, supply pressure is coupled via pipes 123 or 124 to either the upper or lower cylinder 125 or 126 which are operatively connected to the left track swashplate 57. When one cylinder is coupled to pressure, the other cylinder is coupled to return. A steer input signal resulting in actuation of bevel gear 65 with respect to gear 61a causes movement of sun gear 63 which in turn results in movement of spool 71 via rack 69. Movement of spool 71 from its null position couples pressure to the appropriate cylinder on the left swashplate 57, thereby causing the swashplate to move in the appropriate direction. As previously pointed out, movement of left swashplate causes gear 79 to move which in turn actuates the proper follower gear 87 or 89 which in turn actuates gear 97. Movement of input gear 52 results in movement of sun gear 63 via differential gear set 39 and planetary gear set 40. Movement of sun gear 63 modifies the steer input.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. In steering apparatus for steering a track laying vehicle having right and left tracks driven by a drive transmission comprising:
   separate planetary gear transmission system means each drivingly coupled to one of said tracks, said transmissions being driven from a common input;
   separate hydraulic power transmission means each coupled to but one of the said planetary gear transmission system means to independently influence the drive coupled to the corresponding track for controlling the speed of said track, each said power transmission means having a variable displacement means, adjustment thereof in one direction influencing the corresponding transmission system means to provide an increase in the corresponding track speed and adjustment thereof in the other direction providing a decrease in said track speed;
   a. engine speed governor means responsive to engine power level and engine speed, said governor means being coupled to one of said hydraulic power transmission means for varying the displacement means of said one hydraulic power transmission means in accordance with said engine power level and speed;
   b. steer means for providing a variable steer signal; and
   c. first means actuated by said steer signal and the displacement means of each of said hydraulic power transmission means for varying the displacement means of the other hydraulic power transmission means whereby the displacement of both said hydraulic power transmission means varies with said steer signal.

2. The combination as defined in claim 1 wherein said first means includes comparator means and steer valve means actuated by said comparator means, said comparator means being actuated by said steer signal and the displacement means of each of said power transmission means, and said steer valve means is coupled to said other power transmission means.

3. The combination as defined in claim 1 wherein
   a. said separate hydraulic power transmission means include variable stroke, multipiston hydraulic means and swashplate means for varying the stroke of said pistons; and b. said engine speed governor means includes valve means actuated by said engine power level and engine speed and piston means actuated by said valve means, said piston means being coupled to said swashplate means of said one of said power transmission means whereby the speed of said track corresponding with said one of said power transmission means is controlled in accordance with changes in engine power level and engine speed.

4. The combination as defined in claim 3 wherein said first means includes comparator means and steer valve means actuated by said comparator means, said comparator means being actuated by said steer signal and the displacement means of each of said power transmission means, and said steer valve means is coupled to said other power transmission means.

5. The combination as defined in claim 4 wherein said valve means further includes spring means, governor means for applying a first compressive force to said spring means for a second compressive force thereto to oppose said first compressive force.

6. The combination as defined in claim 4 and additionally including a source of hydraulic pressure, said steer valve means coupling said source of hydraulic pressure to said piston means for varying the displacement of said swashplate of said other hydraulic power transmission means.

7. The combination as defined in claim 6 wherein said comparator means comprises a differential and planetary gear set.

8. The combination as defined in claim 7 and additionally including separate reversing means coupling each of said swashplates to said comparator means whereby when each of said swashplates reaches the end of its travel in any given direction and begins to travel in the opposite direction the polarity of the input to said comparator remains the same.